United States Patent
Betzler et al.

(10) Patent No.: US 7,392,314 B2
(45) Date of Patent: Jun. 24, 2008

(54) SYSTEM AND METHOD FOR LOAD—BALANCING IN A RESOURCE INFRASTRUCTURE RUNNING APPLICATION PROGRAMS

(75) Inventors: Boas Betzler, Magstadt (DE); Steffen Rost, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/916,884

(22) Filed: Aug. 12, 2004

(65) Prior Publication Data
US 2005/0055696 A1    Mar. 10, 2005

(30) Foreign Application Priority Data
Aug. 15, 2003   (EP)  ................................. 03102555

(51) Int. Cl.
*G06F 15/173*   (2006.01)

(52) U.S. Cl. ................. 709/226; 709/201; 709/217; 709/224

(58) Field of Classification Search ................. 709/201, 709/217, 224, 226
See application file for complete search history.

(56) References Cited

U.S. PATENT DOCUMENTS

| | | | | |
|---|---|---|---|---|
| 6,119,143 A | * | 9/2000 | Dias et al. | 709/201 |
| 6,370,565 B1 | * | 4/2002 | Van Gong | 709/205 |
| 6,651,082 B1 | * | 11/2003 | Kawase et al. | 718/105 |

* cited by examiner

*Primary Examiner*—Michael Won
(74) *Attorney, Agent, or Firm*—Arthur Ortega

(57) ABSTRACT

The idea of the present invention is to provide a challenge-response mechanism to acquire work scope split range information from the application's Work Scope Split component of the over-utilized resource. By using the work scope split range information, the provisioning system is able to add a new resource, install a new application for that new resource, configure the new and the over-utilized resource's application, and reconfigure the load-balancer in accordance with the work scope split range information. The present invention adds scalability to complex and stateful application programs and allows dynamic provisioning of resources for these application programs.

7 Claims, 7 Drawing Sheets

(With added resource)

(Without added resource)

(With added resource)

(Statefull Application Program)

(Without added resource)

(With added resource)

SYSTEM AND METHOD FOR LOAD—BALANCING IN A RESOURCE INFRASTRUCTURE RUNNING APPLICATION PROGRAMS

FIELD OF THE PRESENT INVENTION

The present invention relates to load-balance in general, and in particular to load-balance by a provisioning system that manages resources running application programs, especially stateful application programs.

BACKGROUND OF THE INVENTION

The term load-balance as used in the present invention means the functionality to divide the amount of computational workload that a resource (e.g. computer, server, application, storage media etc.) has to do between one or more resources (existing or added resources).

The term provisioning system as used in the present invention covers all components which are required to accomplish load-balance in a resource infrastructure with a plurality of resources.

The term stateful application program as used in the present application means that each instance of an application program is dedicated to a group of requests indicated by the request's content, and contrary hereto a stateless application program means that each instance of an application program can handle each incoming request.

PRIOR ART

A typical example of such provisioning system can be found in a web-site hosting infrastructure (see FIG. 1A/B) that is composed of many servers (resources) that are dedicated to serving instances of web applications for a number of different web sites.

Typically, a load-balancer (request dispatcher) "load-balances" requests from the Internet to a suitable server. To decide which server to direct the request to, the load-balancer uses either a simple scheduling algorithm like round-robin or load statistics.

The load-balancer has a list of servers that can be targeted. For round-robin, the load-balancer goes through the list of all servers, targets the request at the next in the list and advances one positioning in the list. For load statistics, the server with the least amount of current workload is targeted. Hence, each request can be directed to each server in the web farm.

The system utilization of the application server is monitored by a Monitor component. The utilization data or performance parameter are correlated by a correlation services component and compared against certain rules. As long as the service-level agreement (SLA), e.g. response time >2 second, can be fulfilled, no change will be made to the system setup. If a violation occurs, the correlation services component requests a new resource from the resource provisioning component. The resource provisioning component provides a new server from a resource pool and configures this server (e.g. installs, configures, starts the application etc.). The resource provisioning adds the new server to the list of servers known by the load-balancer. At this point of time, the load-balancer is able to distribute the incoming workload not only over the already existing servers, but also on the new provisioned server using simple scheduling algorithm (e.g. round robin).

In prior art scenarios with stateful application programs the above mentioned prior art load-balancer (round-robin or statistics) cannot be used. Instead a load-balancer is used which distributes the incoming requests depending on their content information to the assigned application programs (see FIG. 1C). For example, the first server with its application program can only handle customer A-D, the second server with its application program can only handle E-H, and the third server with its application program can only handle J-M, the load-balancer cannot simply distribute client requests of customer A-D to the second or third server when the first server is over-utilized because they are dedicated to the first server exclusively.

The prior art approach to avoid such over-utilization of servers is simply to use servers with stronger CPU (e.g. faster clock rate), more CPUs, more storage capacity etc. A disadvantage of such an approach is that configuration of the server infrastructure is determined on the highest estimated peak workload.

Dynamically changing workloads have no effects to the configuration of the server infrastructure itself. Resources are permanently assigned to a certain server infrastructure without being permanently used. This incurs costs without resource use.

BRIEF SUMMARY OF THE INVENTION

The idea of the present invention is to provide a challenge-response mechanism to acquire work scope split range information from the application's Work Scope Split component of the over-utilized resource. By using the work scope split range information, the provisioning system is able to add a new resource, install a new application for that new resource, configure the new and the over-utilized resource's application, and reconfigure the load-balancer in accordance with the work scope split range information. The present invention adds scalability to complex and stateful application programs and allows dynamic provisioning of resources for these application programs.

Starting from this, the object of the present invention is to provide an improved method and system avoiding the disadvantages of the prior art approaches.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
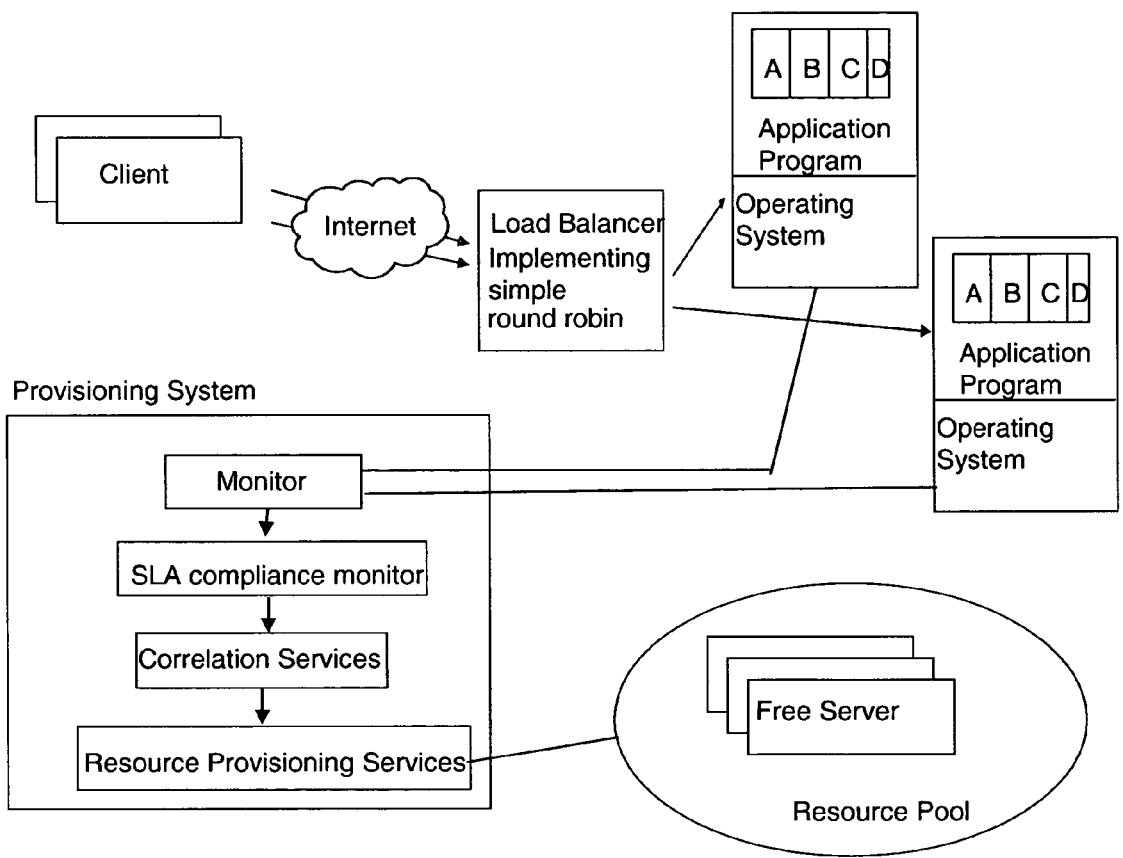
FIG. 1A shows a prior art client-server infrastructure with a provisioning system for stateless web applications before a resource is added.
Figure 1B:
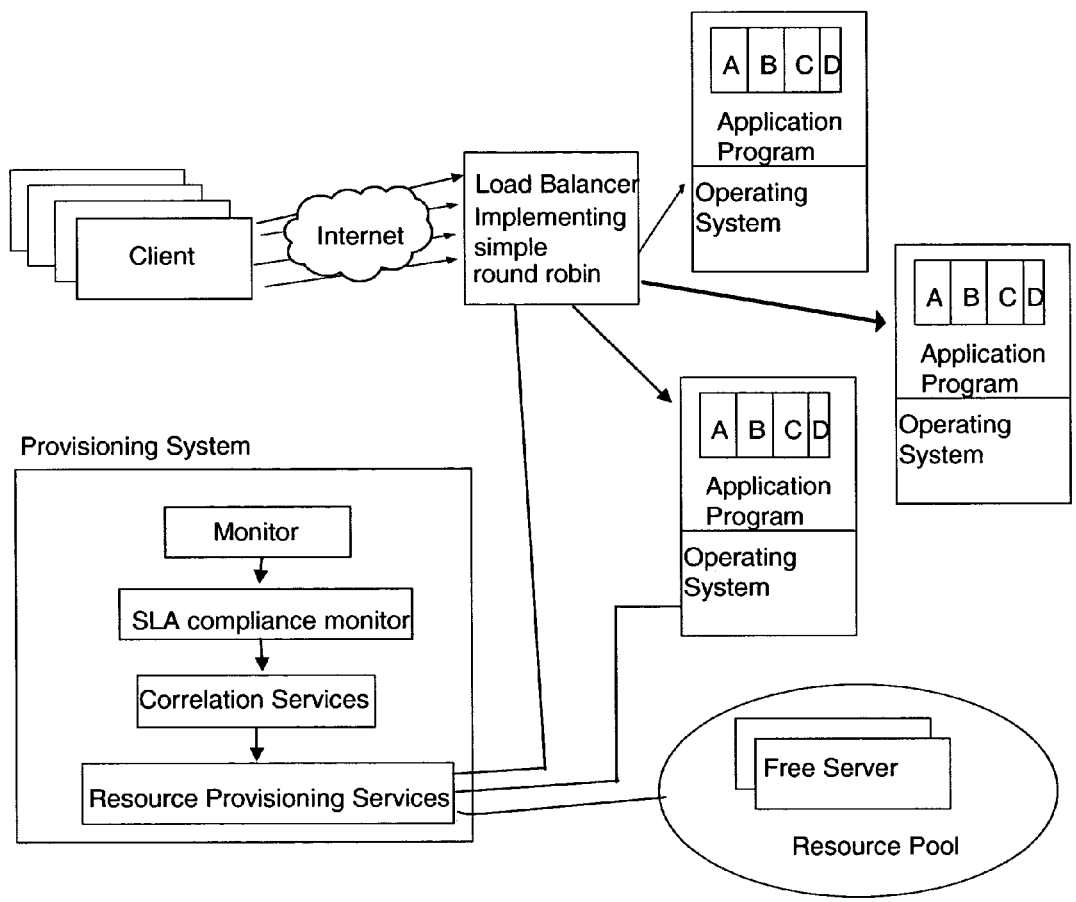
FIG. 1B shows the prior art client-server infrastructure according to FIG. 1 with added resource.
Figure 1C:
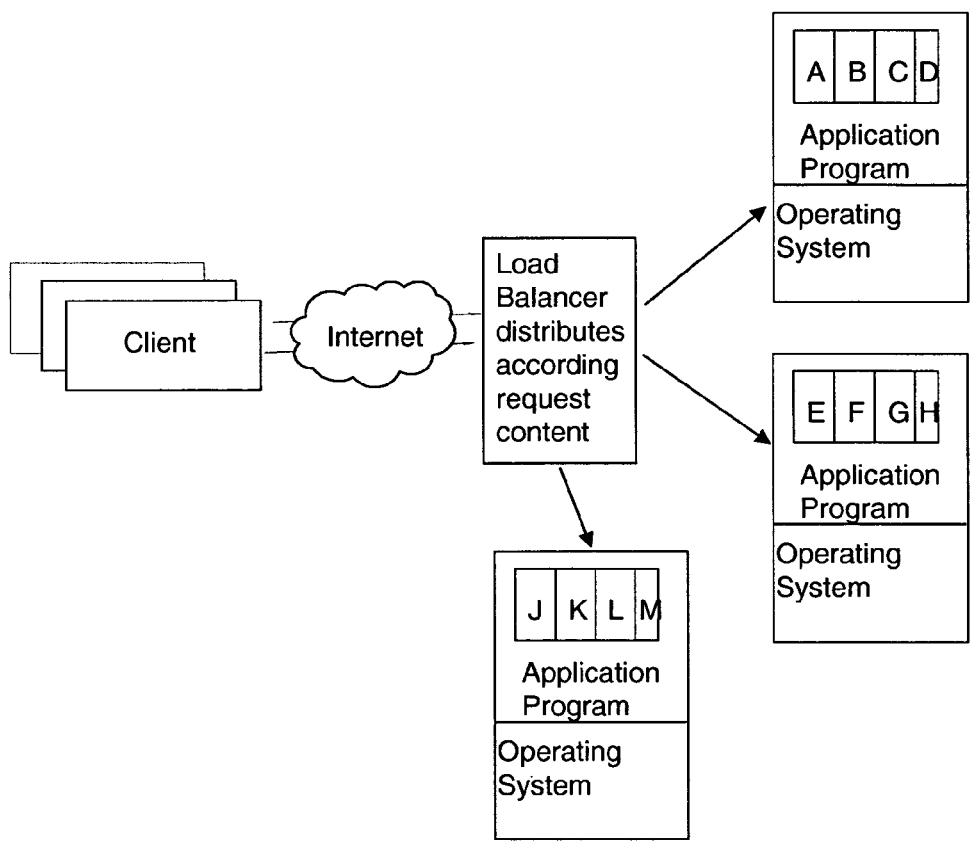
FIG. 1C shows a prior art client-server infrastructure with a provisioning system for stateful web applications.
Figure 2A:
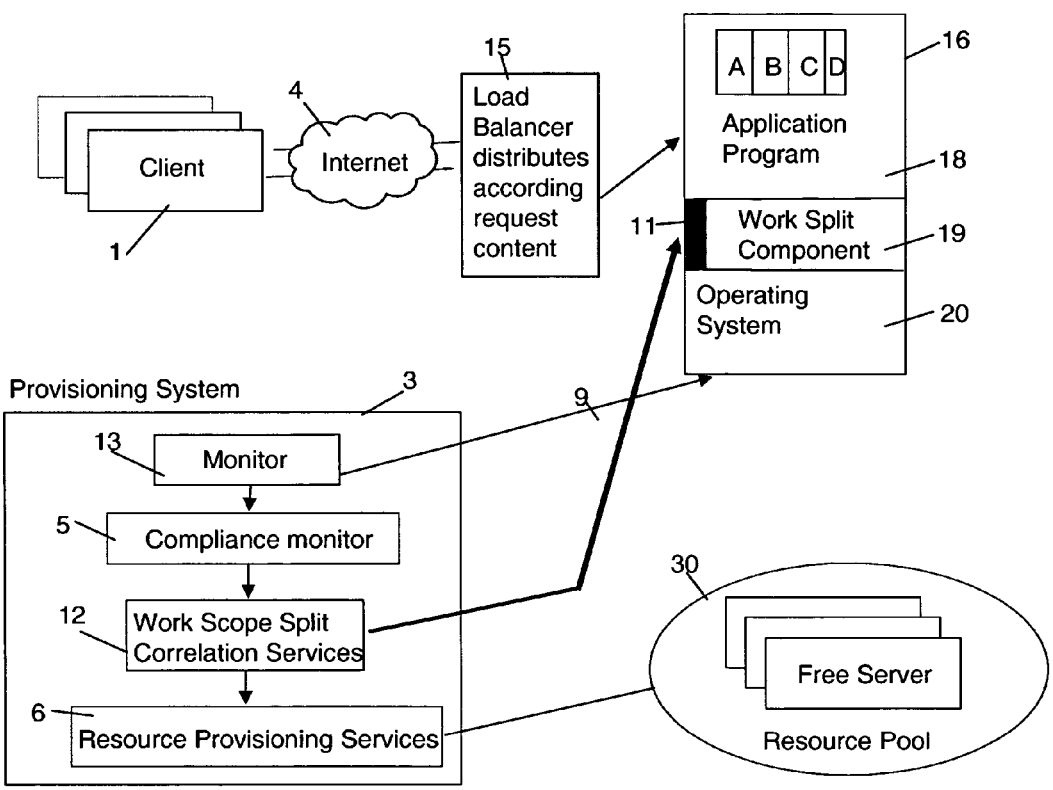
FIG. 2A shows a client-server infrastructure according to FIG. 1C extended by the present invention (without added n resource)

With respect to FIG. 2A, there is depicted a client-server infrastructure extended by the present invention (without added resource).

At the client system 1 side, there is preferably used an application for creating client requests as well as a communication component for establishing communication with the destination server infrastructure. In the case of Internet communication, the application is preferably a browser. Each client request created by the application must include content information which allows distributing the respective client request to its assigned web applications for further processing.

At the destination server infrastructure side, there is preferably used one or more server systems 16 running stateful application programs 18, a load-balancer 15 for determining the respective application program 18 for each incoming client request, and a provisioning system 3 for monitoring the computational workload of the resources, and for adding, installing and configuring new resources when over-utilization of a resource is detected.

In one preferred embodiment of the present invention, such a provisioning system 3 comprises a Monitor component 13 for monitoring the computational workload of the resources, a Work Scope Split Correlation Service Component 12, a Compliance Monitor component 5, and a Resource Provision Services Component 6.

The Work Scope Split Correlation Service Component 12 receives performance data 9 (e.g. CPU utilization, storage consumption, network port utilization) provided by the Monitor 13, correlates the performance data based on certain rules, compares them with the data provided by the Compliance Monitor 5, and finally decides whether the rules (threshold level) are fulfilled or not. The Compliance Monitor 5 which may for example provide access to customer service level agreements (e.g. database for SLA) identifies the respective SLA for the customer using the provided resources and provides the data, e.g. response time <2 seconds) agreed in SLA to the Work Scope Split Correlation Service component.

When an over-utilization of a server is detected, the Work Scope Split Service Correlation Component 12 uses an external interface 11 being provided by the application program's Work Scope Split Component 19 for requesting the workload split range information.

The external interface 11 defines how to request the workload scope split range information by defining interface name, protocol (e.g. XML over HTTP), the request content (e.g. format and required input parameter), and the expected response (e.g. format and output parameters).

The Work Scope Split Component 19 has the functionality to provide a split ratio of the actual computational workload of the over-utilized server 16 running the stateful application program 18 which allows the provisioning system 3 to add a new resource taking over one part of the split workload.

In one preferred implementation of the present invention, the Work Scope Split Component 19 uses current performance data, e.g. performance data provided by the operating system 20, or from the stateful application 18 itself (see FIG. 3) for calculating the workload scope split range information.

In a preferred implementation the workload scope split range is calculated by accessing one or more current performance data of the resource, adding the performance data of all ranges of activities (e.g. several queues) managed by the application program resulting in a total workload, calculating the half of the total workload, adding the performance data of range of activities as long as the half of the total workload is not exceeded and the next to the last range of activity has not been reached resulting in a first workload scope split range information, and returning the first workload scope split range information and the remaining workload scope split range as workload scope split range information to the Work Scope Split Correlation Services component.

In another embodiment of the present invention the Work Scope Split Component 19 uses statistical performance data which is periodically and persistently stored in a database. The statistical data are preferably used to calculate a workload scope split range information in a way as described in conjunction with the use current performance data.

Figure 3:
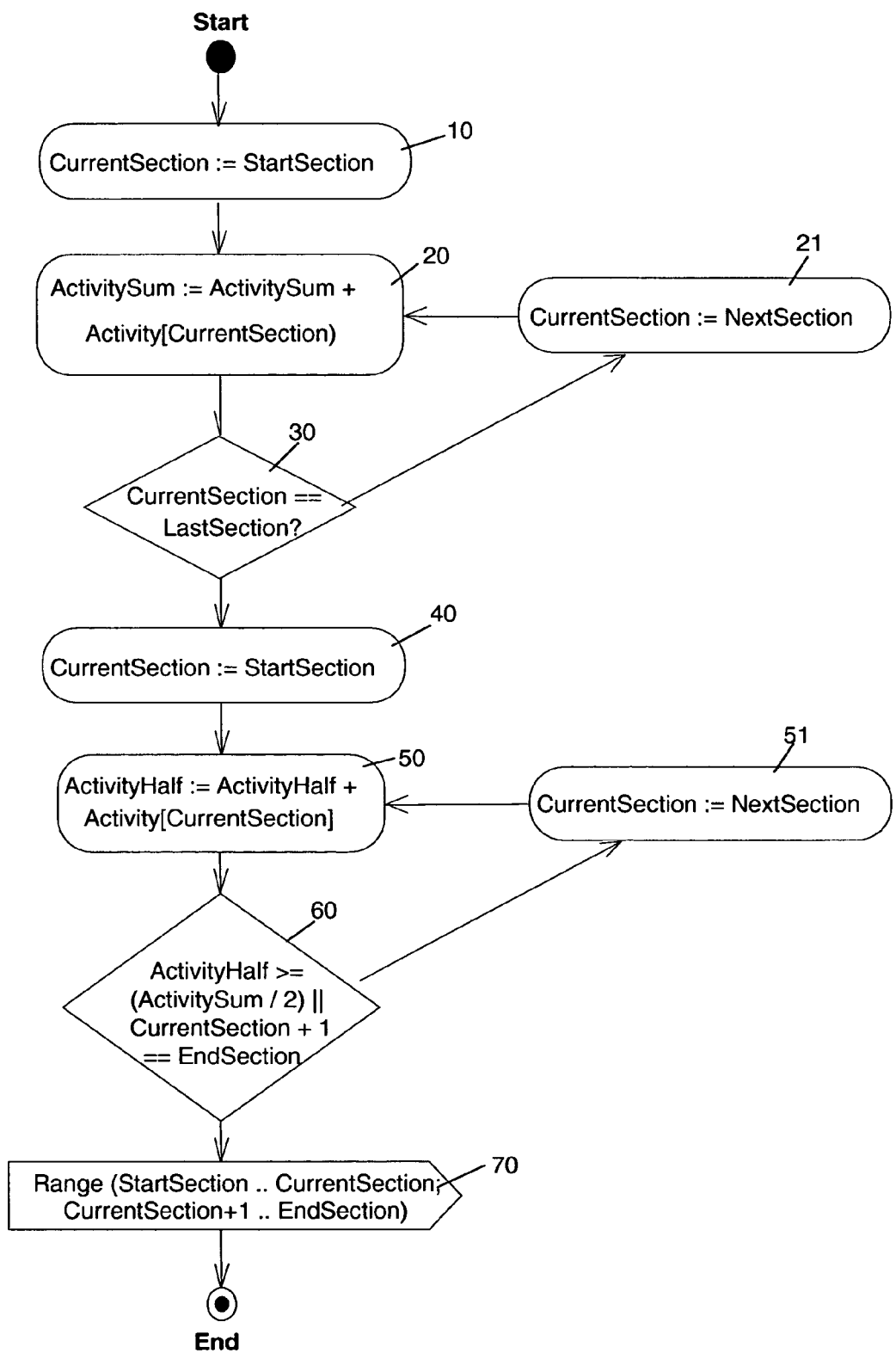
FIG. 3 shows a flow diagram of a preferred implementation of the method carried out by the work split component.

A more detailed implementation of calculation of the workload scope split range information is disclosed with respect to FIG. 3.

When using homogenous resources, the performance data is used to calculate a workload split range information of the over-utilized server in such way that both parts of the work scope split ranges will handle the same computational workload.

In the case of heterogeneous resources, in addition a percentage split on which the workload scope split range information should be based has to be provided with the request created by the Work Scope Split Correlation service component 12. The work scope split range information is then calculated in such a way that both parts of the work scope split ranges will handle a computational workload proportional to the suggested percentage split (e.g. 30% to 70%).

The result of the work scope split will be used to reconfigure the application program 18 of the over-utilized server 16, to configure the application of the newly added server, and reconfigure the load-balancer 15.

Figure 2B:
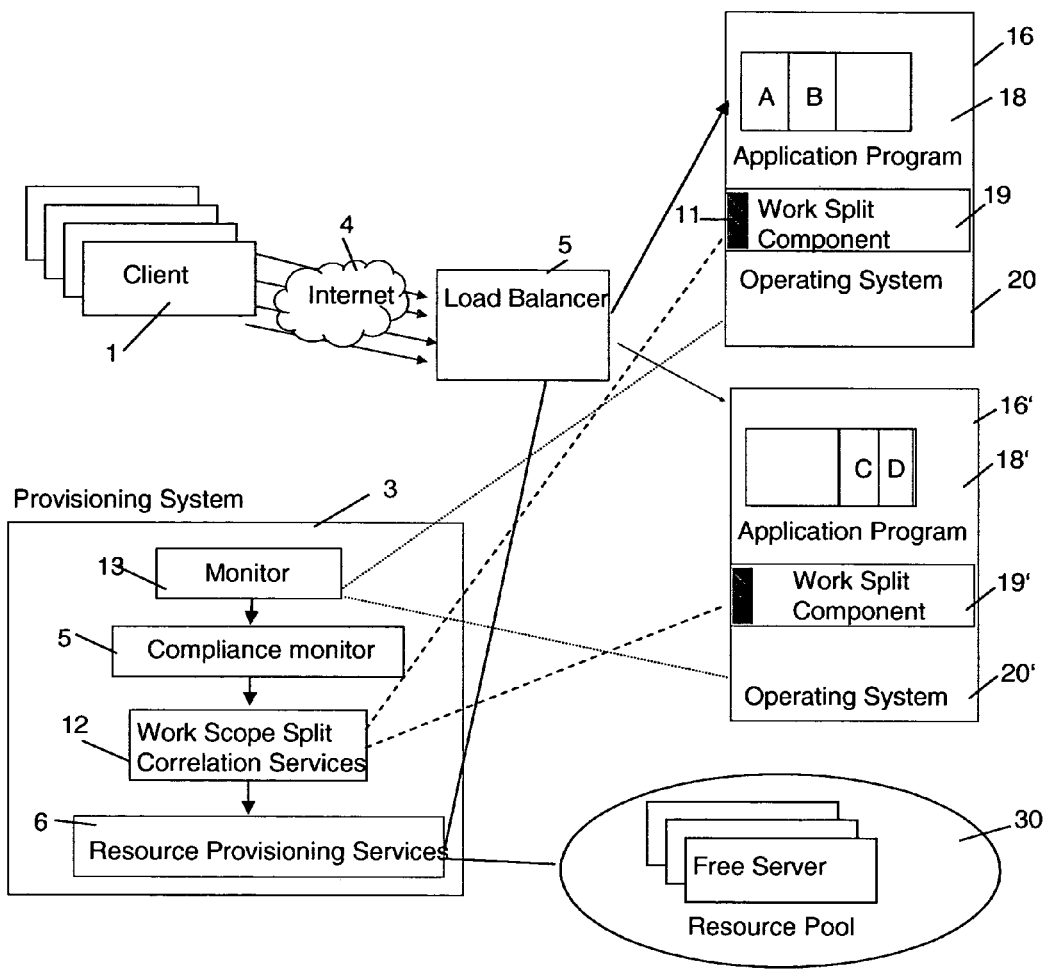
FIG. 2B shows a client-server infrastructure according to FIG. 1C extended by the present invention (with added resource)
Figure 2C:
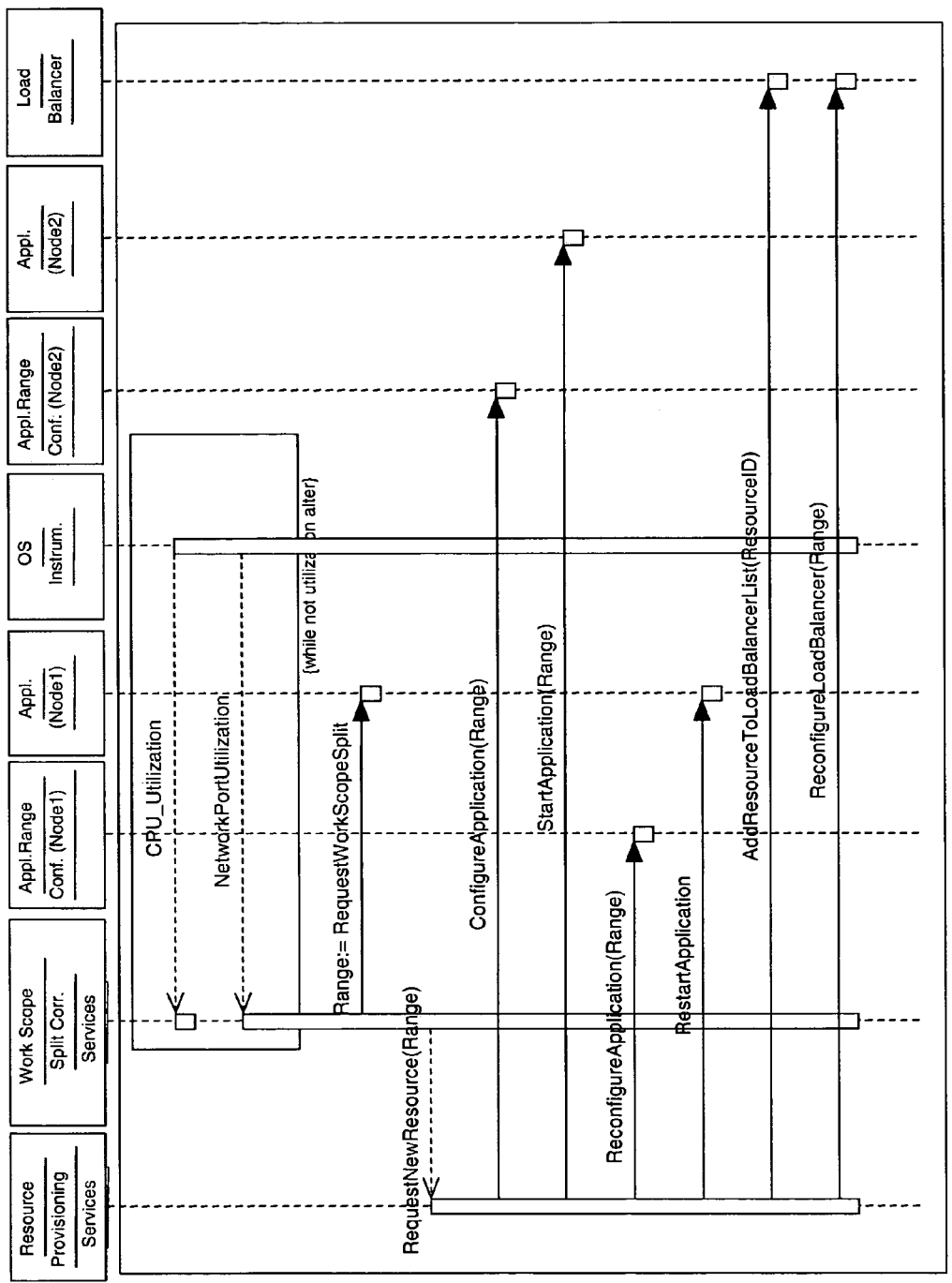
FIG. 2C shows a message flow diagram of the client-server infrastructure as shown in FIG. 2B.

With respect to FIG. 2B, there is depicted a client-server infrastructure (resource infrastructure) extended by the present invention (with added resource) with its message flow diagram FIG. 2C.

The client-server infrastructure which can be, for example, a workplace messaging infrastructure is composed of a number of components like load-balancer, mail queue servers, web servers, database servers, etc.

Typically, a load-balancer 15 (request dispatcher) "load balance" requests from the Internet/Intranet to a suitable server 16. The load-balancer 15 has a list of servers 16 to be targeted. The load-balancer 15 uses either load statistics or analysis of the content of the request to direct the request to the suitable server. Examples of the second case are the mail queue servers 16. Each mail queue server 16 handles a specific number of queues, for example, all requesters starting with the letters A to D. Incoming requests which are dedicated to a specific queue must be therefore directed to the server 16 handling this queue and cannot be sent to an arbitrary mail queue server. The list of servers available to the load-balancer 15 contains a column that identifies the queue details, for example, range of letters handled by this server. The load-balancer 15 inspects the incoming request, identifies the first letter of the requester and directs the request to the server handling this first letter of the requester.

The system utilization (like CPU and network port utilization) of the application servers 16 is monitored by a Monitor component 10. The utilization data or performance data are correlated by a Work Scope Split Correlation Service Component 12 and compared against certain rules. As long as the service level agreements (SLA), e.g. response time <2 seconds, can be fulfilled, no changes will be made to the system set-up.

If an over-utilization occurs, the Work Scope Split Correlation Service Component 12 requests the information on how the computational workload of the application program can be split between an already existing server 16 and a new server 16'. This information (workload scope split range information) will be provided by a Work Scope Split Component 19 being part of the application 18 (or forming a separate component) running on the server that has sent the violation notification (over-utilized server). The Work Scope Split Correlation Service Component will use an external interface 11 (as defined by the application) for requesting the Work Scope Split information from the Work Scope Split Component as described in more detail with respect to FIG. 2A.

The Work Scope Split Correlation Service Component 12 requests a new resource 16' (server) from the resource provisioning component 6. Together with this request, it sends the workload split range information provided by the application's Work Scope Split Component 19 to the Resource provisioning component 6.

The Resource provisioning component 6 provides a new server 16' from a resource pool 30.

The Resource provisioning component 6 configures the application 18' to be started on the new server 16' based on the suggested range, starts the application 18' on the new server 16', reconfigures the application 18 running on the existing server 16 based on the suggested range, restarts the application 18 on the existing server 16, adds the new server 16' to the list of servers known by the load-balancer 15, and reconfigures the load-balancer 15 based on the new work scope split.

For example, instead of one server 16 handling letters A to D, now two servers are available, one handling the letters A to B and the other one handling letter C to D. At this point in time, the load-balancer 15 is able to distribute the incoming workload not only over the already existing servers, but also on the new provisioned server according to the individual request content.

With respect to FIG. 3, there is depicted a floating diagram of a preferred implementation of the method carried out by Work Scope Split Component.

The diagram describes a simple method which could be used by the Work Split component to calculate the workload scope split range information.

Basically, this algorithm calculates first the sum of all activities by adding up the performance data of all individual sections (range of activities) 10, 20. It then calculates the work scope split range in such a way that both ranges (start section . . . current section/current section+1 . . . end section) will handle the same workload.

It is noted that this algorithm is only applicable if at least two individual sections exist. In other words, it would not be possible to calculate the Work Scope Split by splitting up one single individual section into two ranges.

Related to the client-server infrastructure as described with respect to FIG. 2B/C, the method would calculate the workload scope split range of all queues hosted by the mail queue server, based on the current performance data.

More precisely, the method would calculate the total workload by adding the current queue length of all queues hosted by the mail queue server. To give an example, let us assume that four queues A, B, C and D are hosted by the server and that the current queue length of queue A is 10, queue B is 2, queue C is 0 and queue D is 4. In this case, the total queue length would be 16. Then it would split the list of queues into two groups in such a way, that both groups will handle the same work load.

More precisely, starting with the first queue, the method would iteratively add the current queue length of the queues hosted by the mail queue server while the half of the calculated total queue length is not reached or exceeded and at least two queues remain for which the queue length has to be added. Related to the example with the four queues A, B, C and D, the method would start with queue A and add the queue length of queue A which would result in an added up queue length of 10. The method would then compare this added up queue length with the half of the total queue length calculated in the previous step. Related to our example, the method would compare 10 as accumulated queue length with 8 as the half of total queue length. The method would then decide to break the iteration because the half of the calculated total queue length is exceeded. As the last step, the method would return two lists of queues as result. The first list would contain queue A only; the second list would contain queue B, C and D.

Instead of using the current performance data (current queue length in the described example above), it would also be possible to use the statistical average performance data (average queue length) over a certain period of time.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of distributing the computational workload of a resource over at least one other resource, the method comprising the steps of:
   monitoring the computational workload on a first resource running a first instance of an application program;
   automatically requesting workload split range information from said first instance if said computational workload of said first resource exceeds a defined threshold level;
   calculating workload split range information for said computational workload on said first resource if said threshold is exceeded, and returning said workload split range information to said first instance of said application program; and
   preparing a new instance of said application program on another resource and distributing said computational workload of said application program over said at least one other resource in accordance with said workload split range information,
   wherein said application program is a stateful application program.

2. The method according to claim 1, wherein the computational workload is defined by one or more performance data for said first resource.

3. The method according to claim 1, wherein said performance data of said first resource are provided by the resource's operating system or by the first application instance.

4. The method according to claim 1, wherein said threshold level is defined by one performance parameter or by the correlation of performance parameters of said resource.

5. The method according to claim 1, wherein said workload split range information is calculated by using performance data of said first resource provided by the resource's operating system or by said application instance of said first resource.

6. The method according to claim 5, wherein said workload scope split range calculation comprises the steps of:

accessing one or more current performance parameters of said first resource;

adding all said performance data of all ranges of activities managed by said application instance resulting in a total workload;

calculating half of the total workload;

adding said performance data of said ranges of activities as long as half of the total workload is not exceeded and the next to the last range of activity has not been reached resulting in a first workload scope split range indication; and returning said first workload scope split range indication and the remaining workload scope split range information as workload scope split range information.

7. The method according to claim 1, wherein said workload scope split range is divided approximately in half.

* * * * *